United States Patent Office 3,655,871
Patented Apr. 11, 1972

3,655,871
INACTIVATION OF INFLUENZA VIRUSES WITH LOWER ALKYL ESTERS OF ACETIC ACID
Georges Werner, Sceaux, France, assignor to Rhone-Poulenc S.A., Paris, France
No Drawing. Filed Nov. 20, 1967, Ser. No. 684,540
Claims priority, application France, Nov. 21, 1966, 84,337
Int. Cl. A61r *27/00*
U.S. Cl. 424—89 5 Claims

ABSTRACT OF THE DISCLOSURE

Vaccines are prepared from monovalent or polyvalent inactivated viral suspensions of human, equine, porcine, or fowl influenza viruses, said suspensions being prepared by cultivating in the allantoic cavity of the embryonated chicken egg a said virus, separating the allantoic liquid containing the virus, purifying the viral suspension so obtained by centrifugation, and treating a purified suspension of the virus with diethyl ether or ethyl acetate to inactivate the virus, using conditions which maintain the neuraminidase activity of the virus.

The present invention relates to a process for the preparation of inactivated viral suspensions and of monovalent or polyvalent vaccines for combating influenza, and the new vaccines thus obtained.

The viruses used for preparing these vaccines are the human influenza viruses (Types A, $A_1$, $A_2$ or B), equine, porcine or fowl influenza viruses.

The process for the preparation of inactivated viral suspensions, in accordance with the present invention, comprises inoculating one or other of the viral agents mentioned above in the allantoic cavity of embryonated chicken eggs, cultivating the virus by incubation of the inoculated eggs, separating the viral suspension from the eggs and purifying it by centrifugation, and inactivating the virus by treatment with diethyl ether or ethyl acetate under conditions maintaining the neuraminidase activity of the virus. The suspensions obtained, emulsified with an oily adjuvant of predetermined composition, give stable oily emulsions of inactivated influenza viruses which can be administered to human beings or to animals for protecting them against influenzal infections caused by the viruses characteristic of each of these species.

In practice, the particles of influenza viruses of the various antigenic types mentioned above are cultivated in accordance with the usual techniques in the allantoic cavity of the embryonated chicken egg and, after incubation for about 2 to 3 days, the allantoic liquids are drawn off and purified by differential centrifugation and filtration. In this way, there are obtained viral suspensions suitable for the inactivation treatment.

Inactivation of this viral suspension, with or without the addition of a buffering agent such as an isotonic phosphate solution, is effected by treatment with diethyl ether by the technique particularly described by F. M. Davenport and collaborators, J. Lab. Clin. Med. 63, 5 (1964), so as to obtain haemagglutinating, antigenic but non-infectious sub-units of the viral particles. The treatment with diethyl ether is effected by adding the ether to the previously obtained purified viral suspension (preferably employing two volumes of ether per unit volume of viral suspension) and stirring the mixture at a temperature of from 0° to 5° C. Afterwards, the suspension of haemagglutinating sub-units is separated by decantation. Under these conditions, the neuraminidase activity of the viruses is preserved. The viral suspension is then checked by the usual procedures to ensure it is free from infectious influenza viruses and pyrogens. In the inactivation step, ethyl acetate can, with advantage, be used instead of diethyl ether.

For human or veterinary use, by subcutaneous or intramuscular route, the aqueous suspension of inactivated viral particles obtained by the process hereinbefore described is emulsified in a mixture of one or more vegetable or mineral oils, or hydrophilic natural triglycerides, and an appropriate emulsifying agent so as to obtain stable suspensions which can be easily administered. As the vegetable oil, it is preferred to use soya oil, but sesame, peanut and olive oil are also suitable. As the hydrophilic natural triglyceride, there may, for example, be employed polyoxyethylenated oleic triglycerides or polyoxyethylenated palmitostearic triglycerides. Mannitol oleate is preferably used as the emulsifying agent.

The emulsion is obtained by the usual methods, for example, by stirring rapidly the mixture of the inactivated viral suspension and two oily adjuvants at a temperature in the region of 0° C. In this way, an emulsion of haemagglutinating sub-units is obtained which can be used for immunising human beings or animals. The emulsion constitutes a vaccine which can be administered subcutaneously or intramuscularly.

The inactivated viral suspension can also be used directly; more particularly, it can be administered by the nasal route after atomisation by any appropriate means. The suspension can be stored in containers, such as atomiser bottles, with an appropriate gaseous or liquid propellent, enabling withdrawal from the container of a dispersion in the form of fine droplets or aerosols.

For use by the rectal route, the aqueous suspension of inactivated viral particles is lyophilised and the lyophilisate is incorporated into a fatty excipient which is usual for suppositories.

The process previously described is applicable to the preparation of monovalent vaccines against influenza. If polyvalent vaccines are desired, it is sufficient to mix the suspensions of separately obtained monotype haemagglutinating sub-units and then incorporate them into the oily adjuvant, as previously described.

The process of preparation as described above enables new vaccines against influenza to be obtained, which vaccines constitute an improvement in this field because of their excellent immunising activity, the duration of the immunity produced, their ease of administration (subcutaneously, intramuscularly, nasally or rectally) and their absence of pyrogenic effect.

The following examples illustrate the invention:

EXAMPLE I

The strain $A_2$/England/1/66 of $A_2$ influenza virus, or the strain B/Rumania/2/66 of B influenza virus, or the strain Ann Arbor/1/57 of $A_1$ influenza virus, or any other strain of human influenza virus of antigenic types A, $A_1$, $A_2$ or B obtained from the collection of the World Influenza Centre in London, is cultivated in the allantoic cavity of embryonated chicken eggs having 10 days of incubation. The inoculated eggs are incubated at 37° C. for 48 to 72 hours and then refrigerated at 4° C. for 18 hours, care being taken to remove beforehand the eggs of which the embryos are dead. After refrigeration, the allantoic liquids of the inoculated eggs are withdrawn aseptically by suction by means of a vacuum pump and combined in order to form a pool of 500 to 1000 cc. The quantity of virus present in this mixture is determined by the haemagglutination reaction and by titration in ovo. By varying, according to the influenza strain used, the dilution of the inoculum and the period of incubation of the inoculated eggs, it is attempted to obtain pools containing between 512 and 2048 haemagglutinating units per cc. (HAU/cc.) of virus.

These pools are then clarified by centrifugation at low speed (about 1,000G) for 15 minutes; the supernatant substances are centrifuged for 60 minutes at 40,000G in a preparative ultracentrifuge. The pellet obtained is brought into suspension homogeneously in a volume of isotonic phosphate buffering agent (pH 7.2; see R. Dulbecco and M. Vogt, J. Exp. Med. 99, 167 (1954)).

This concentrated suspension is then purified by centrifugation in density gradients of potassium tartrate or sucrose (see C.E. Schwerdt and F.L. Schaffer, Virology 2, 665 (1956); J.F. McCrea et al., Nature 189, 220 (1961), using a preparative ultracentrifuge. The gradient zones containing the highest content of HAU/cc. are combined so as to obtain a viral suspension containing at least 5,000 HAU per mg. of protein. This suspension can then be diluted in an isotonic phosphate buffering agent so as to contain from 1,000 to 2,000 HAU/cc' of virus.

For treatment with diethyl ether in order to inactivate the virus, one volume of the purified viral suspension as obtained above has added to it two volumes of diethyl ether free from peroxide, and 1 mg. per cc. of polyoxyethylenesorbitan monooleate (Tween 80). This mixture is placed in a melting ice bath and continuously stirred by means of a blade-type agitator for 5 hours, the operation taking place under aseptic conditions. The ether and viral suspension, now composed of haemagglutinating sub-units, are separated by decantation and the residual ether is evaporated in vacuo. The amount of HAU/cc. is determined by the usual method after this treatment; it is generally found that it is slightly higher than the original amount. The suspension of haemagglutinating sub-units is then filtered through cellulose ester membranes (mean dimension of pores: 0.45 micron) in order to eliminate any contaminating material.

The tests for bacterial and fungal sterility are carried out by the usual techniques on thioglycolate broth, nutrient agar medium of the National Institute of Health, Sabourand's agar nutrient medium and special enrichment broth for Mycoplasma. The absence of residual infectious influenza virus after treatment with diethyl ether is determined by two successive passages at different dilutions into the allantoic cavity of the embryonated chicken egg. The absence of pyrogenic effect is established by the usual technique by intravenous injection into a rabbit.

The bacteriologically sterile suspension, free from infectious influenza virus and pyrogens, is kept at 4° C. in sealed ampoules, after addition of sodium merthiolate to give a final concentration of 1 in 10,000.

The formation of an emulsion of the previously obtained suspension of haemagglutinating sub-units of influenza viruses in an oily adjuvant is carried out in the following manner:

To 30 cc. of the suspension, there are added 27 cc. of soya oil, 3 cc. of mannitol oleate and 0.5 cc. of polyoxyethylenesorbitan monooleate (Tween 80) which have all been previously sterilised. (The vegetable oils are sterilised by filtration through cellulose ester membranes; the mannitol oleate and the polyoxyethylenesorbitan monooleate are sterilised in an autoclave). While keeping the resulting mixture in a bath of melting ice, the rod of a turbine disperser (Ultra-Turrax type) is introduced aseptically into it, and is operated for 5 minutes. A white, creamy, homogeneous and stable emulsion is obtained, which is kept at 4° C. in flasks with rubber stoppers and equipped with metal caps.

The monovalent vaccine thus obtained is suitable for intramuscular or subcutaneous administration to man in a volume of 1 cc. (intramuscularly) or 0.4 cc. (subcutaneously).

EXAMPLE II

By operating as described in Example I and starting with the same strain of influenza virus, but using ethyl acetate as the inactivation agent, there is obtained a suspension of haemagglutinating sub-units of the initial virus, of which the controls are effected as described in Example I.

EXAMPLE III

For the preparation of polyvalent vaccines intended for administration to man by the intramuscular or subcutaneous route, the various strains of influenza virus of types A, $A_1$, $A_2$ and B which it is desired to incorporate into the vaccine are cultivated in ovo, purified by centrifugation and treated with diethyl ether or ethyl acetate, as described in Examples I and II. The various monotypic suspensions thus obtained are then mixed so that the final suspension contains 100 to 500 HAU/cc. of each antigenic type represented. The controls for sterility, absence of residual infectious virus and absence of pyrogens, and emulsification in the oily adjuvant and the storage of the vaccine, are carried out as in Example I.

EXAMPLE IV

The preparation of anti-influenza vaccine intended for immunisation of the porcine species is effected as follows The strain A/Swine $S_{15}$ of porcine influenza virus is cultivated in ovo and the virus is purified as described in Examples I and II, but limiting the purification to the first stage (centrifugation at 40,000G for 60 minutes). The treatment with diethyl ether is effected as described in Example I. The final suspension should contain 500 to 1,000 HAU/cc. of virus. The controls for sterility and absence of residual infectious virus are carried out as in Example I. Emulsification in the oily adjuvant is also effected as in Example I, but to the mixture, before its dispersion, there is added 5% of an interesterified natural triglyceride (such as Labrafil M 1944 C or Labrafil M 2735 (Gattefosse)). The vaccine so obtained is suitable for administration by the intramuscular route, using a volume of 5 cc.

EXAMPLE V

The preparation of anti-influenza vaccine intended for immunisation of the horse species is carried out in the same way as in Example IV but using, as virus strains, the equine influenza viruses A/Equi/Prague and A/Equi/Miami, or strains which are antigenically related to them. The vaccine is bivalent, comprising a strain of Type A/Equi/Prague and a strain of Type A/Equi/Miami. As in the case of the porcine vaccine, the oily adjuvant (vegetable oil plus mannitol oleate) contains 5% of an interesterified natural triglyceride. The vaccine is suitable for intramuscular administration, using a volume of 5 cc.

EXAMPLE VI

The preparation of anti-influenza vaccine intended for immunising turkeys is carried out as in Examples IV and V but using, as the virus strain, the fowl influenza virus turkey/England/63 (Langham). The oily adjuvant, as in the case of the porcine and equine vaccines, contains 5% of an interesterified natural triglyceride. The vaccine is suitable for administration by the intramuscular route (using a volume of 1 cc.) or subcutaneously into the wing membrane (using a volume of 0.2 cc.).

EXAMPLE VII

The preparation of anti-influenza vaccine intended for administration to human beings by the intranasal route is carried out as in Examples I and II as regards the culture of the viruses in ovo, their concentration, their purification, their treatment with diethyl ether or ethyl acetate and the mixing of human strains representative of the types A, $A_1$, $A_2$ and B, so as to obtain a monovalent or polyvalent vaccine. The tests for sterility and absence of residual infectious virus are the same as in Examples I and II. After treatment with diethyl ether or ethyl acetate, the addition of sodium merthiolate to the suspensions of haemagglutinating sub-units is omitted. It is assured that the sub-units have maintained a neuraminidase enzymatic activity by making an aliquot part react with a preparation of mucoproteins extracted from the sub-maxillary gland of an ox and determining the liberation of N-acetylneuraminic acid from this substrate.

The monotype or polytype aqueous suspension of haemagglutinating sub-units is not emulsified in an oily adjuvant, as in the preceding examples. It is placed in an atomising apparatus under nitrogen pressure and administered by atomisation into the nostrils.

EXAMPLE VIII

Suppositories intended for immunising human beings by the rectal route are prepared in the following manner.

The viruses of Type A, $A_1$, $A_2$ and B are cultivated in ovo, concentrated, purified and disintegrated with diethyl ether or ethyl acetate, as described in Examples I, II and III. The monotype or polytype aqueous suspensions of haemagglutinating sub-units obtained, to which sodium merthiolate is not added, are lyophilised and the dry product is incorporated into an interesterified hydrogenated palm oil preparation (Labrafil M 2273 C type (Gattefosse)), melted beforehand at 38° C., which is then left to solidify in appropriate moulds in order to form suppositories. The proportion of lyophilised suspension of haemagglutinating sub-units added to the mass for suppositories as described above is calculated in such a way that each suppository contains at least 1,000 haemagglutinating units of each virus strain represented in the vaccine.

I claim:

1. In a process for the preparation of a vaccine of an influenza virus by inactivation of a suspension of an influenza virus, said suspension being produced by cultivation in the allantoic cavity of the embryonated chicken egg and purified by differential centrifugation, the improvement which comprises inactivating the said virus suspension containing at least 100 HAU/cc. by contact at 0°–5° C. with ethyl acetate in an amount and for a time sufficient to inactivate said suspension, and emulsifying the inactivated suspension in a carrier selected from the class consisting of mineral and vegetable oils and natural and synthetic triglycerides.

2. The improvement of claim 1 in which two volumes of the ethyl acetate are used per unit volume of viral suspension.

3. The improvement of claim 1 in which the virus in suspension in an isotonic phosphate buffering agent is treated with the ethyl acetate.

4. A process for preparing inactivated influenza viruses comprising the steps of treating an aqueous composition containing influenza viruses with a lower alkyl ester of acetic acid in an amount and for a time sufficient to inactivate the viruses and separating the virus-containing aqueous composition from the ester.

5. The improvement of claim 4 in which the lower alkyl ester of acetic acid is ethyl acetate.

References Cited

FOREIGN PATENTS

388/65 4/1965 Ireland.

OTHER REFERENCES

Biological Abstracts, vol. 28, entry 14243, June 1954, citing Smith et al., Brit. Jour. Exptl. Pathol., 34(5): 512–524 (1953), copy of Biol. Abst. in Group 120.

Lief et al., Virology, vol. 2, pp. 753–771, 1956.

Tyrrell et al., The Lancet, pp. 235–237, Jan. 30, 1960.

RICHARD L. HUFF, Primary Examiner

U.S. Cl. X.R.

195—1.4